United States Patent [19]

Ishikawa et al.

[11] Patent Number: 5,633,095

[45] Date of Patent: May 27, 1997

[54] BATTERY HOLDING STRUCTURE

[75] Inventors: Satoshi Ishikawa; Kazuaki Iwami; Masaru Ohira, all of Iwata, Japan

[73] Assignee: Yamaha Hatsudoki Kabushiki Kaisha, Iwata, Japan

[21] Appl. No.: 559,624

[22] Filed: Nov. 20, 1995

[30] Foreign Application Priority Data

Nov. 18, 1994 [JP] Japan ................................ 6-285182
Dec. 28, 1994 [JP] Japan ................................ 6-339033

[51] Int. Cl.⁶ ..................................... H01M 2/10
[52] U.S. Cl. .................. 429/1; 429/96; 429/121; 429/187; 180/68.5
[58] Field of Search .................. 429/1, 7, 49, 65, 429/96–100, 121, 123, 187; 180/68.5; 320/2

[56] References Cited

U.S. PATENT DOCUMENTS 3,437,164  4/1969  Rabjohn ........................... 429/96 X
4,435,486  3/1984  Pomaro et al. ..................... 429/1
4,756,978  7/1988  Nitcher et al. .................... 429/96 X
4,847,170  7/1989  Martin ............................. 429/1

FOREIGN PATENT DOCUMENTS 0539269   4/1993   European Pat. Off. .
 590674   4/1994   European Pat. Off. .
 686549  12/1995   European Pat. Off. .
2355707   1/1978   France .

Primary Examiner—Anthony Skapars
Attorney, Agent, or Firm—Knobbe, Martens, Olson & Bear LLP

[57] ABSTRACT

A number of embodiments of electric power assisted bicycles including a battery case arrangement that is comprised of inner and outer cases with the inner case receiving the batteries. In this way, the batteries are protected from the elements and yet can be conveniently and easily detached and carried to a remote location for charging.

17 Claims, 9 Drawing Sheets

BATTERY HOLDING STRUCTURE

BACKGROUND OF THE INVENTION

This invention relates to a battery holding structure and more particularly to a battery holding arrangement and rechargeable battery assembly for a vehicle having an electric motor powered by the battery.

There has been proposed a type of vehicle wherein the vehicle is primarily operated by manual power. However, there is also incorporated an electric motor assist mechanism wherein the operator's manual power is supplemented by the operation of an electric motor. This type of device has been utilized in bicycles and other types of vehicles, particularly wheeled vehicles. This type of mechanism provides operation with normal manual feel while permitting reduced force expenditures.

With this type of vehicle, however, the battery is not normally charged during vehicle operation. Therefore, periodic charging of the battery is required.

In many instances, this type of vehicle is employed by an individual who may leave the vehicle at a place which is not necessarily convenient to a power source. Thus, there is some desirability in ensuring that the batteries may be easily detached and taken with the operator to a location where they can be charged. This requires the making and breaking of connections which obviously presents problems.

In addition to these problems, the battery in the vehicle is normally exposed. This is particularly true with such vehicles as bicycles which do not have large body assemblies and which components can be enclosed. This presents a likelihood of not only the batteries becoming dirty or soiled, but also positions the terminals in a location where they can become subject to the elements. This can cause corrosion and other problems.

It is, therefore, a principal object of this invention to provide an improved battery structure for a vehicle.

It is a further object of this invention to provide a battery structure for a vehicle wherein the battery and its terminals and connections is well-protected from the elements even though the vehicle may not have a protective body.

It is a further object of this invention to provide an improved battery arrangement for a vehicle wherein the battery may be readily detached and removed to another location for charging.

It is a still further object of this invention to provide an improved battery case and carrier assembly for use with vehicles of this type.

SUMMARY OF THE INVENTION

This invention is adapted to be embodied in a rechargeable battery assembly for an electric motor equipped vehicle having a body. An outer battery box is carried by the body and contains a terminal internally therein and which is connected externally to the electric motor for powering the electric motor. The outer battery box defines a sealed internal volume in which the terminal is contained. An inner battery box is adapted to contain at least one rechargeable battery and is detachably positioned within the outer battery box. The inner battery box has an external terminal portion that cooperates with the outer battery box terminal when positioned within the outer battery box to provide electrical power to the outer battery box terminal for the vehicle electric motor.

DETAILED DESCRIPTION OF THE PREFERRED EMBODIMENTS OF THE INVENTION

Figure 1:
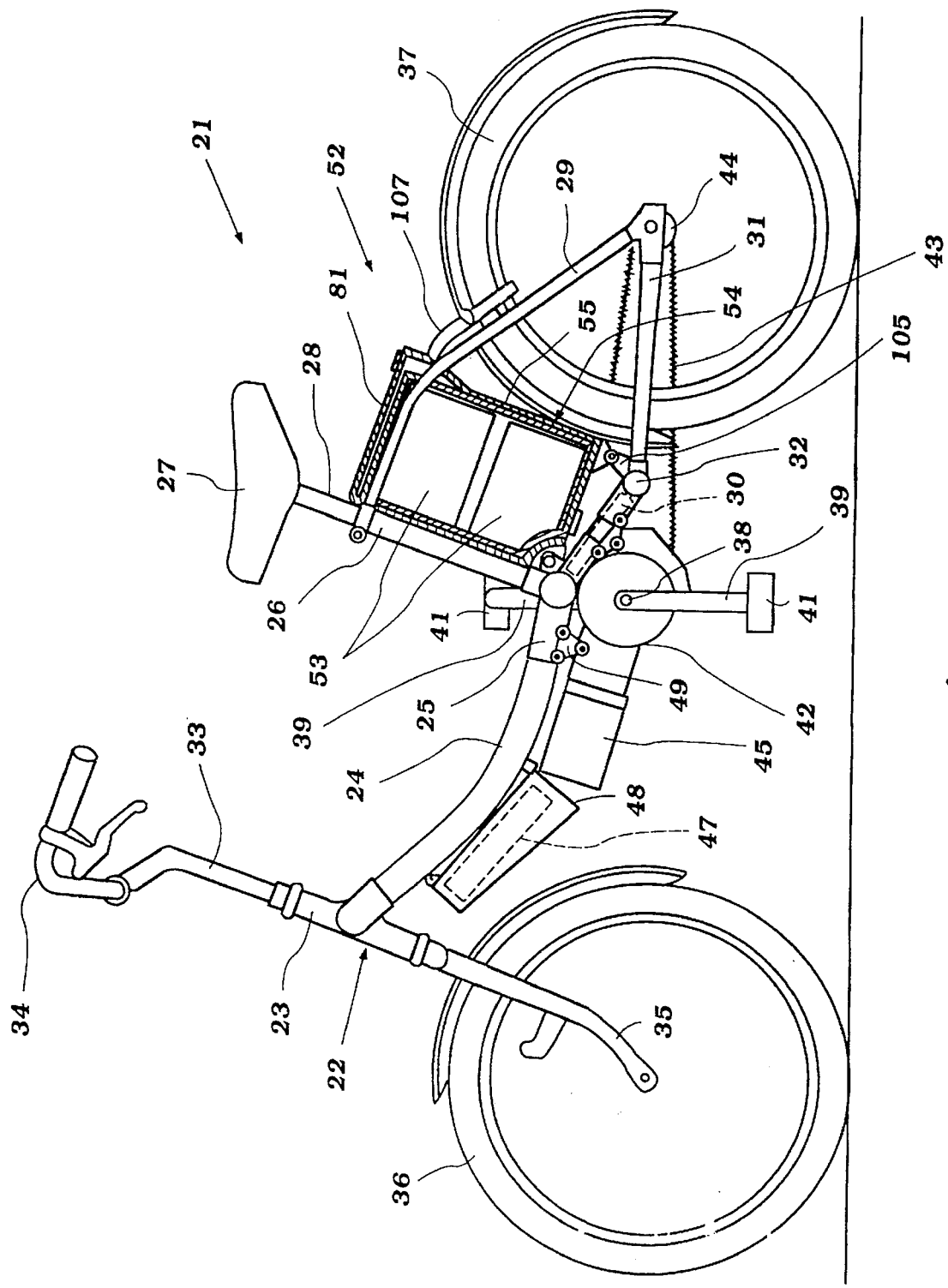
FIG. 1 is a side elevational view of a bicycle constructed in accordance with a first embodiment of the invention, with portions broken away and shown in section, and with a part of the vehicle body removed.

Referring now in detail to the drawings, and initially to the embodiment of FIGS. 1–10 and primarily to FIG. 1, an electric power assisted bicycle constructed in accordance with an embodiment of the invention is indicated generally by the reference numeral 21. The bicycle 21 is comprised of a frame assembly, indicated generally by the reference numeral 22, which includes a headpipe 23. The headpipe 23 has connected integrally to it and extending downwardly and rearwardly, a main frame tube 24. The configuration of the main frame tube 24 permits riding by either male or female riders. The rear portion of the main frame tube 24 is detachably connected to a bracket 25 which, in turn, connects it to a seat pillar 26. A seat 27 is affixed, in a manner to be described, to a seat post 28 and is adjustably connected in the seat pillar 26 in a known manner so as to accommodate riders of varying statures.

A pair of seat stays 29 are connected at their upper ends to the upper end of the seat pillar 26 and extend downwardly and rearwardly, where they are connected to the side pieces 31 of a trailing arm assembly. The trailing arm assembly includes a pair of side arms 31 that are connected at their forward ends to a bracket assembly 32 which, in turn, is connected to the bracket assembly 25, through a tube 30. This assembly is thus coupled detachably with the seat pillar 26 and main frame tube 24 to complete, in essence, the frame assembly 22.

The headpipe 23 journals a handlebar assembly 33 for steering movement about a vertically extending axis under the control of an adjustable handlebar 34. A front fork 35 depends from the headpipe 23 and is connected to the handlebar assembly 33 for steering of a front wheel 36 that is journaled by the front fork 35 in a known manner.

A rear wheel 37 is rotatably journaled by the trailing arms 31 and reinforced by the seat brackets 29. This rear wheel 37 is driven in a manner which will now be described.

A crank assembly 38 is rotatably journaled by the frame 22 at the bottom of the seat pillar 26. A pair of crank arms 39 carry respective pedals 41 on opposite sides of the crank 38 assembly. This crank assembly 38 is contained within a case 42 of a power unit and is adapted to apply manual power to a chain 43 which drives the rear wheel 37 through a free-wheel or one-way clutch 44.

In addition to this manual power, an electric motor, indicated generally by the reference numeral 45, is coupled through a transmission contained within the case 42 and one-way clutch for selectively driving the chain 43 to provide added power assist for driving the rear wheel 37.

The mechanism includes a torque sensor or other operator input sensor which senses the torque or pressure which the operator places on the pedals 41 and crank assembly 38. This signal is transmitted to a controller 47 that is mounted in a housing assembly 48 carried by the underside of the main tube 24 so as to switch on or off electrical power from a pair of batteries, to be described, through a circuit arrangement, including connections, as will be described. The amount of electric power assist is controlled by the controller 47 through a suitable control arrangement, which may include a chopper type that is capable of changing the on/off time ratio (duty ratio) of the DC voltage applied to the motor 45 in any known type of control strategy. In this regard, the motor 45 may be either a permanent-type, magnet-type DC motor or a DC series-wound motor.

It should be understood that the construction of the bicycle 21 as thus far described may be of any conventional type. In addition, and although the invention is described in conjunction with a bicycle, it should be readily apparent that certain facets of the invention may be employed with other types of vehicles, wherein the vehicle is normally manually powered with only an electrical assist. Of course, the invention also may be utilized in conjunction with vehicles having a total electric motor operation.

The electric motor 45 and transmission as thus far described may be mounted on the frame assembly 22 by means that include a pair of mounting brackets 49 and 51. Alternatively, the main casing 42 of the transmission may be formed integrally with the frame assembly 22. Again, any type of construction known in the art may be employed.

The source of electrical power for the electric motor 45 is provided by a battery assembly, indicated generally by the reference numeral 52. This comprises a pair of rechargeable electric batteries 53 that are contained within a first, inner battery case, indicated generally by the reference numeral 54 and shown in most detail in FIGS. 3, 5 and 6. This inner battery case 54 is contained within an outer battery case, indicated generally by the reference numeral 55, and shown in most detail in FIGS. 4 and 7.

Figure 3:
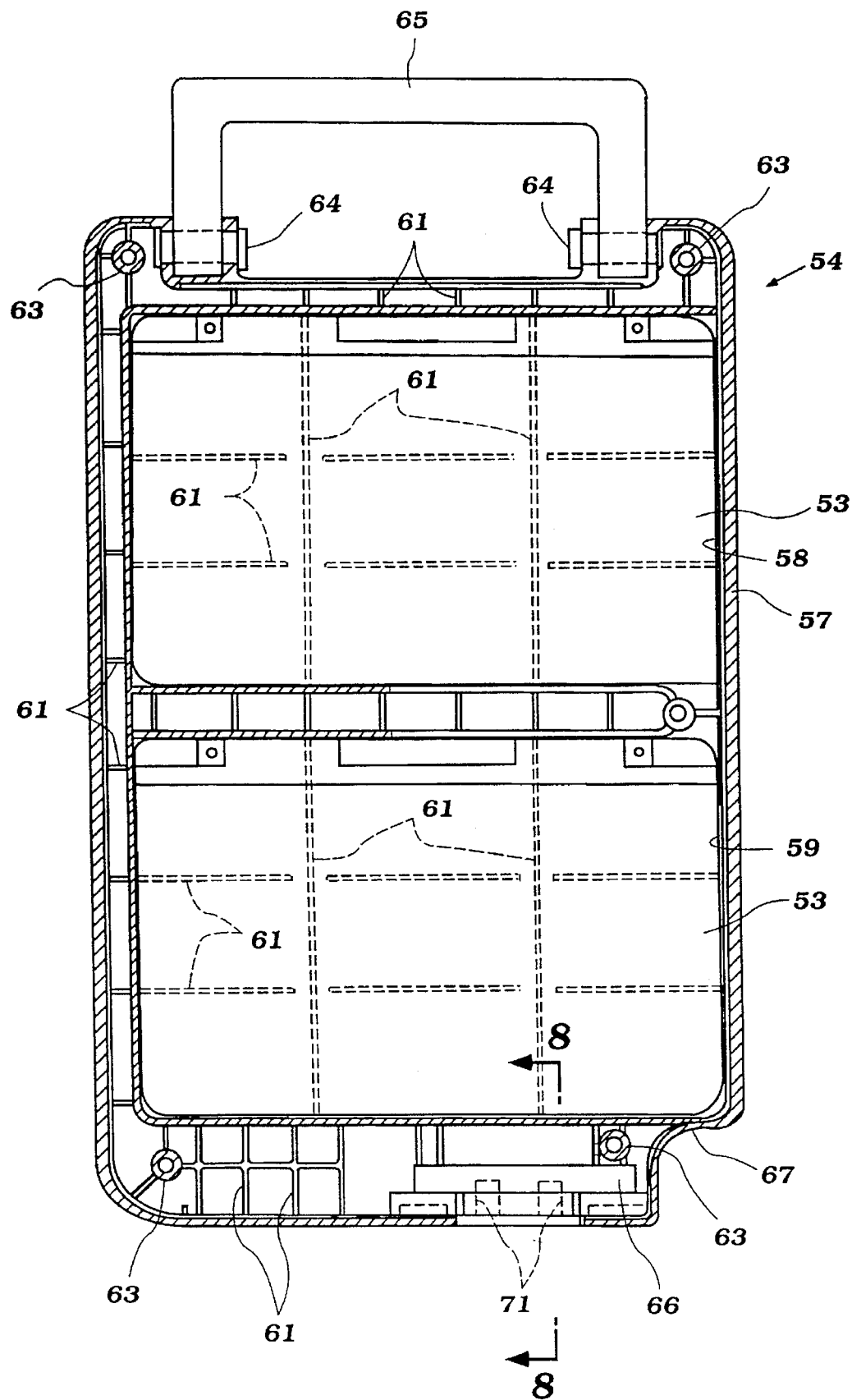
FIG. 3 is an enlarged cross-sectional view taken through the internal battery box, showing it detached from the vehicle and the manner in which it may be carried.

The construction of the inner battery case 54 will now be described by primary reference to FIGS. 3, 5 and 6. It should be seen that the inner battery case 54 is comprised of two main pieces 56 which may be formed from a molded plastic or the like. These main pieces 56 are symmetrical in configuration and are joined to each other, in a manner to be described, along facing surfaces 57. When joined together, the pieces 56 define an upper battery chamber 58 and a lower battery chamber 59, each of which receives one of the batteries 53.

A plurality of internal ribs 61 are disposed between the batteries 53, the outer case portions 56, and between the inner case portions 58. These ribs 61 provide not only a protective shock-absorbing assembly, but also space the batteries 53 from each other and from the main housing so as to provide air gaps for cooling, silencing and insulation purposes. In addition, certain wiring may be contained internally in the case in these areas for this protection. The outer periphery of the members 56 are also provided with ribs 62 for these same purposes and so as to assist in alignment of the inner case 54 within the outer case 55, in a manner which will be described.

The pieces 56 defines a plurality of through openings 63 at spaced locations so as to receive threaded fasteners for holding the case portions 56 to each other.

Figure 4:
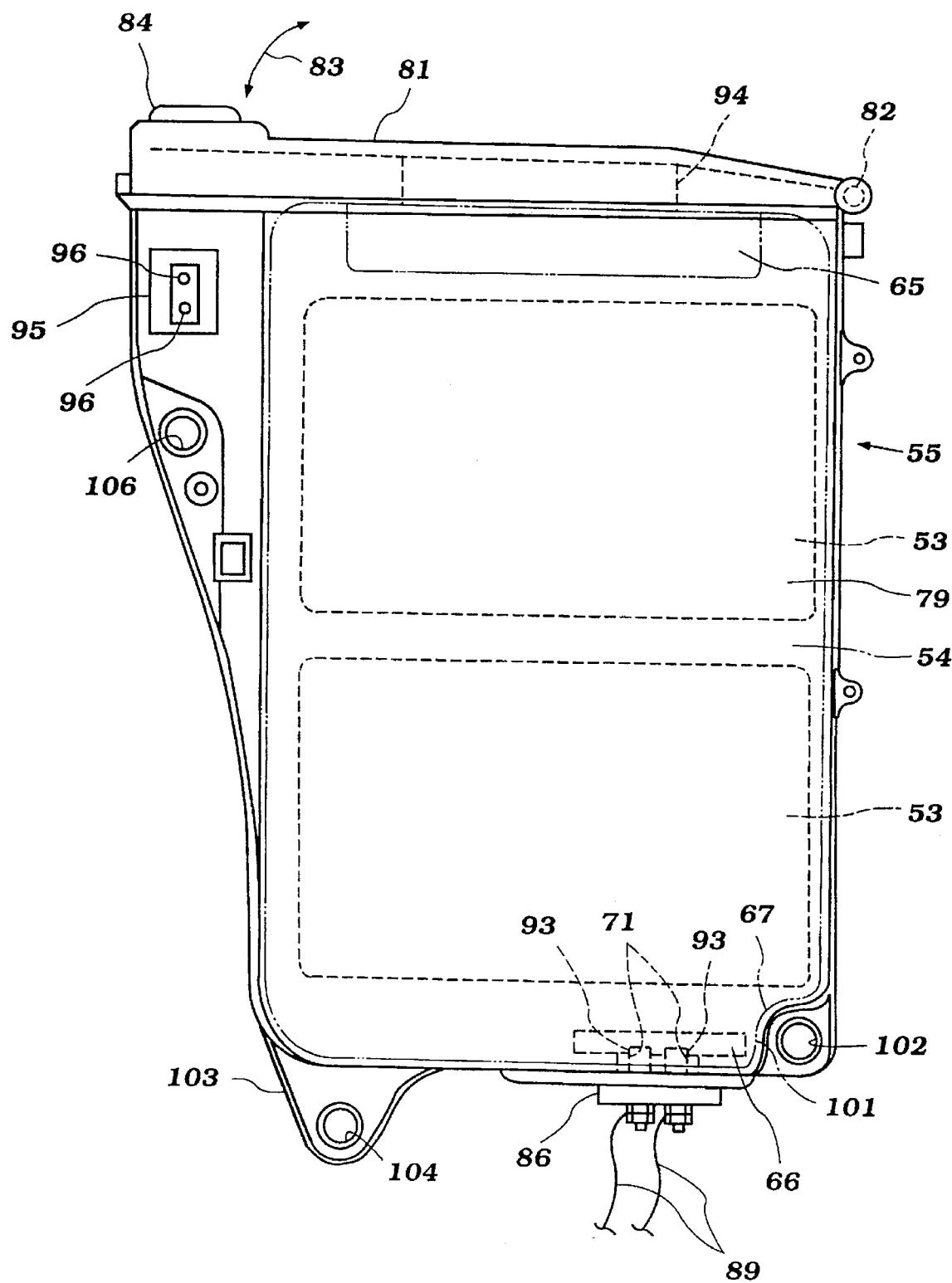
FIG. 4 is a side elevational view, looking in the same direction as FIG. 3, and shows the internal battery box positioned within the external battery box.

At the upper end, there are provided a pair of pins 64 on which a handle assembly 65 is journaled. This handle assembly 65 may thus be swung to an upright carrying position, as shown in FIGS. 3–5, so as to assist in transporting the batteries 53 to a location where they can be charged. When positioned in the outer case 55, the handle 65 is pivoted to a lowered storage position, as shown in FIG. 4.

Figure 8:
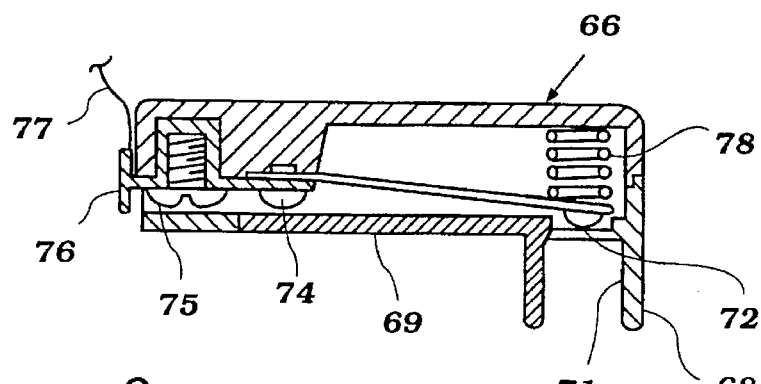
FIG. 8 is an enlarged cross-sectional view taken along the line 8—8 of FIG. 3 and through one of the terminals of the internal battery box.

A terminal block, indicated generally by the reference numeral 66, and having a configuration as best shown in FIG. 8, is provided at the lower end of the inner case 54 contiguous to an arcuate recess 67 formed therein for a purpose which will be described. The terminal blocks 66 are each formed from an insulating material and are comprised of an outer portion 68 and an inner portion 69 that defines a female terminal opening 71 for receiving a terminal post, as will be described.

A contact point 72 is carried at the outer end of a leaf spring 73 that is held to the piece 68 by means of a retainer screw 74 and a terminal screw 75. The terminal screw 75 has a terminal portion 76 to which a conductor 77 is connected so as to lead and be connected to the appropriate posts of the batteries 53. The batteries 53 may be wired in series or parallel, as desired.

A coil compression spring 78 urges the terminal portion 72 to a downward position. In this position, however, the terminal contact point 72 is still contained within the terminal recess 71. Hence, when the battery case is removed for charging, the terminals of the battery will be well protected from the elements.

Figure 7:
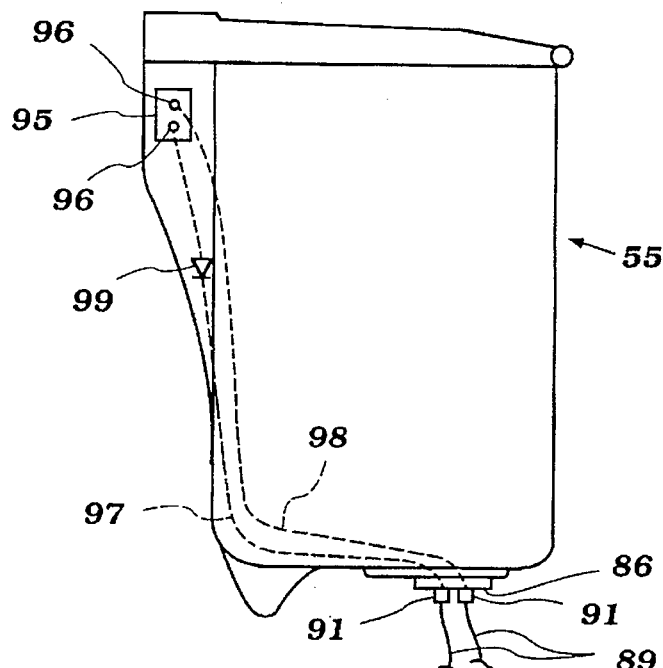
FIG. 7 is a view, in part similar to FIG. 4 but on a smaller scale, and shows the electrical connections.

Referring now to the construction of the outer case 55, this may be best understood by reference to FIGS. 4 and 7. The outer case 55, like the inner case 54, may be formed from a molded plastic or the like. The outer case 55 comprises a main body member 79 that defines an internal cavity that is configured to accept the inner case 54. The aforenoted external ribs 62 formed on the inner case 54 may engage the inner surface of this cavity so as to provide positioning of the inner case 54 within the outer case 55 while maintaining some clearance therebetween.

A cover piece 81 is pivotally connected to the rear end of the main body member 79 by means of a hinge pin 82 for pivoting between a closed and an opened position. This degree of pivotal movement is indicated by the arrow 83 in both FIG. 4 and in FIG. 10. A lock mechanism 84 may be provided for releasably locking the cover 81 in its closed position. If desire, this lock may be operated by the same key as for the main switch for the bicycle 21 as well as a wheel lock therefor.

Figure 9:
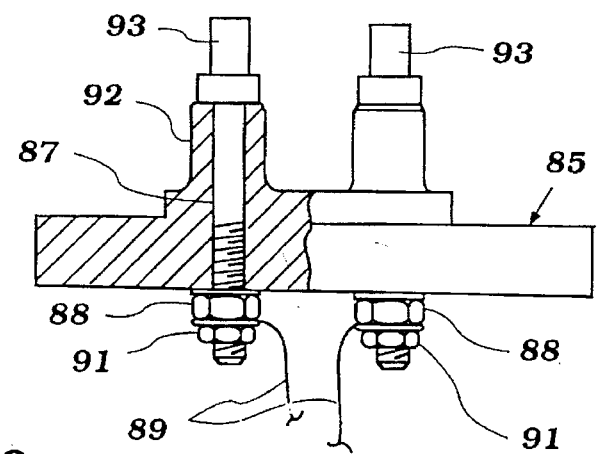
FIG. 9 is a side elevational view, with a portion broken away, showing the terminals of the external battery box.

A male terminal assembly, indicated generally by the reference numeral 85 and having a construction as best shown in FIGS. 4, 7 and 9 is provided for connection with the terminal block 66 of the inner case 54 to connect the batteries 53 to the circuit including the controller 47. This terminal assembly 85 includes a base part 86 that is adapted to be held in abutting relationship with the lower wall of the main outer case member 79.

A pair of threaded terminal posts 87 extends through the terminal block 86 and are held in place thereby by lock nuts 88 and washers. Conductors 89 are connected to these threaded terminals by means of terminal nuts 91 and further locking washers. These conductors lead to the controller 47 and are in circuit with it in any suitable manner.

The terminals 87 extend through upstanding posts 92 formed within the interior of the outer case 55. The terminals 87 have cylindrical portions 93 that are adapted to extend into the inner case terminal block 66 through the opening 71. Therein these portions 93 contact the terminal contact 72 to complete the electrical connection with the internal conductors 77 when in place. The cylindrical projections 92 of the terminal block 86 has a diameter complementary to that of the opening 71.

The outer case 55 is also provided with a suitable seal between the cover piece 81 and the main body portion 79 so as to provide a water and substantially air-tight seal for the inner case 54 when received therein. Art elastic block 94 may be provided on the cover piece 81 for holding the terminals 93 and 66 in engagement when the inner case 54 is contained within the outer case 55.

Thus, it should be readily apparent that the electrical terminals, except for the connections of the wires 89 to the terminal post 87, is totally enclosed and sealed. Hence, there will be no corrosion that occur and the batteries 53 will be well-protected.

In order to permit charging in place, there is provided a further, charging terminal block, indicated generally by the reference numeral 95 and which is shown in best in FIGS. 4 and 7. This is mounted, in use, toward the rear of the bicycle and there are provided a pair of terminal connections 96 that are adapted to receive a suitable junction box for a charger. Internal wires or conductors 97 and 98 interconnect the charger connections 96 with the terminal posts 87. One or more diodes 99 may be provided in either one or both of the conductors 97 and/or 98 so as to permit charging, but to prevent someone from drawing external current from the batteries 53 through the charging terminal block 95.

The way in which the outer case 55 and the contained internal case 54 and batteries 53 are mounted on the frame of the bicycle 21 will now be described by primary reference to FIGS. 1, 4 and 10. As may be seen, the outer battery case 55 is mounted to the rear of the seat pillar 26 in this embodiment so that the hinge pin 82 for the cover 81 will be disposed generally to a point adjacent the underside of the seat 27. At a lower point in this area, the outer case 55 is provided with a recess 101 adjacent a flange in which a mounting opening 102 is provided.

The mounting opening 102 is adapted to receive a fastener 103 (FIG. 1) connected to the rear portion of the bracket 25 for supporting the battery cases in this area. A further mounting lug 103 is formed at the front lower portion and it has a mounting opening 104 that receives a threaded fastener passing through a bracket 105 mounted on the bracket 32 for rear support of the cases.

Finally, the area immediately beneath the charging terminal 95 is provided with a final opening 106 that receives a fastener carried by a bracket 107 of the rear seat stays 29 so as to provide a rigid attachment for the battery case 55 to the rear of the seat pillar 26.

In addition to affording the facility of providing the mounting opening 102, the recess 101 and the correspondingly shaped recess 67 of the inner and outer cases 55 and 54, respectively, serve an added function. As may be seen, these recesses are formed at only one side of the inner case 54 and outer case 55. Accordingly, the inner case 54 will be accepted fully into the outer case only in one direction. Thus, if the operator attempts to insert the inner case 54 in the outer case 55 in a reverse direction, this will not be possible and the terminals 71 and 93 cannot fully engage nor will it be possible to close the cover 81. As a result, the operator can readily discern that he has placed the inner case 54 in the outer case 55 incorrectly.

In addition, the inner case carrying handle 65 is provided with a series of ribs or recesses 110 at one end, which end corresponds to the rear end of the assembly. Hence, even in the dark the operator will know my the feel of the handle 65 which way the inner case 54 should be inserted into the outer case 55.

Figure 10:
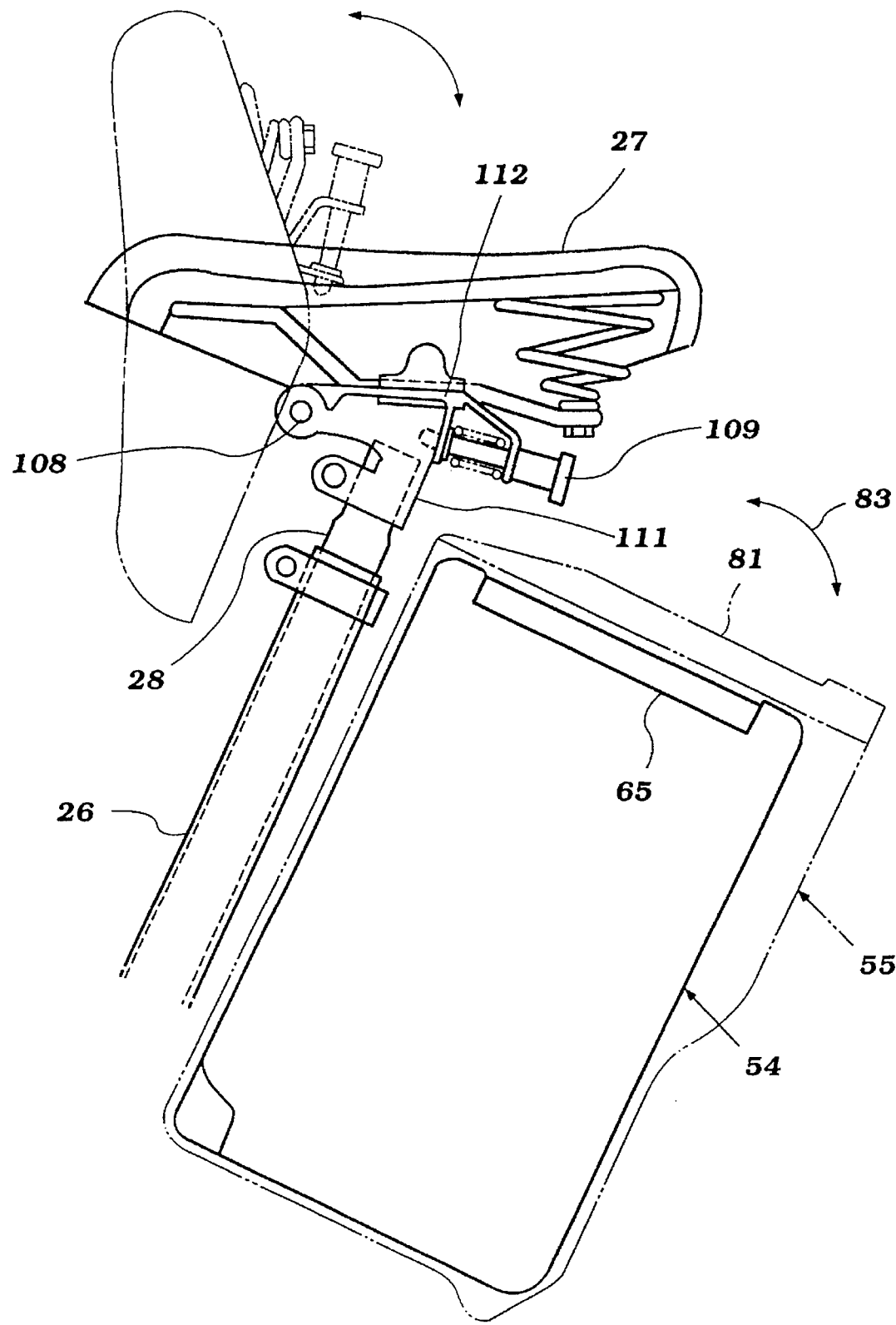
FIG. 10 is a side elevational view showing how the battery may be accessed for replacement in accordance with the embodiment thus far shown.
Figure 11:
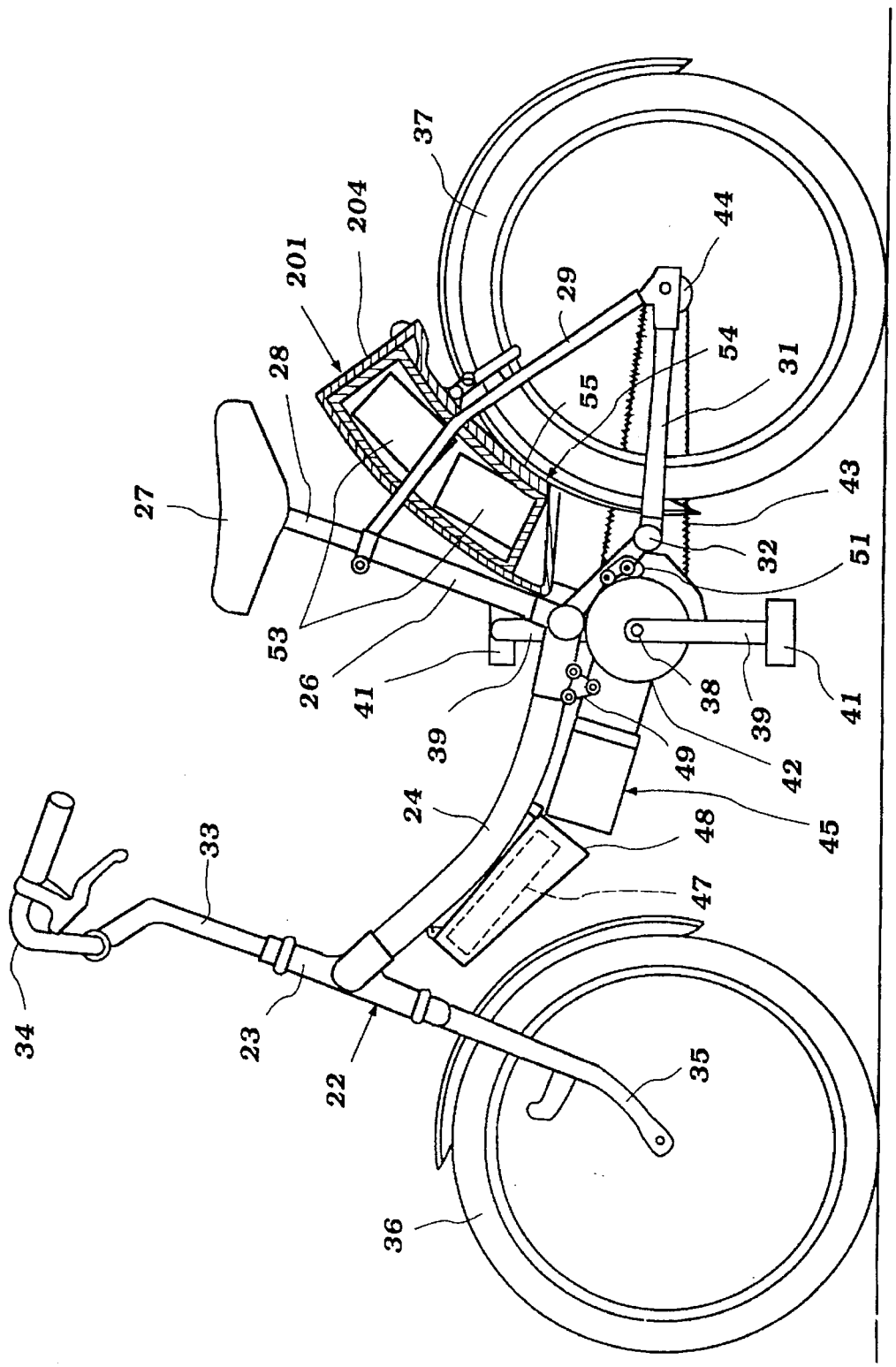
FIG. 11 is a side elevational view with a portion broken away, in part similar to FIG. 1, and shows another embodiment of the invention.

In order to facilitate ease of access of the battery case cover 81 without necessitating elevation of the seat 27, particularly when the seat 27 is in its lower position as shown in FIG. 10, the seat 27 has a mounting base that has a pivotal connection 108 to the upper end of the seat post 28. A latching assembly comprised of a latch pin 109 has a portion that extends into a detent opening 111 in a seat bracket 112. When the pin 109 is withdrawn, the seat 27 may be pivoted in the direction of the arrow 113 so as to clear the battery cover 81 and permit the inner batter case 54 that contain batteries to be readily removed.

Figure 2:
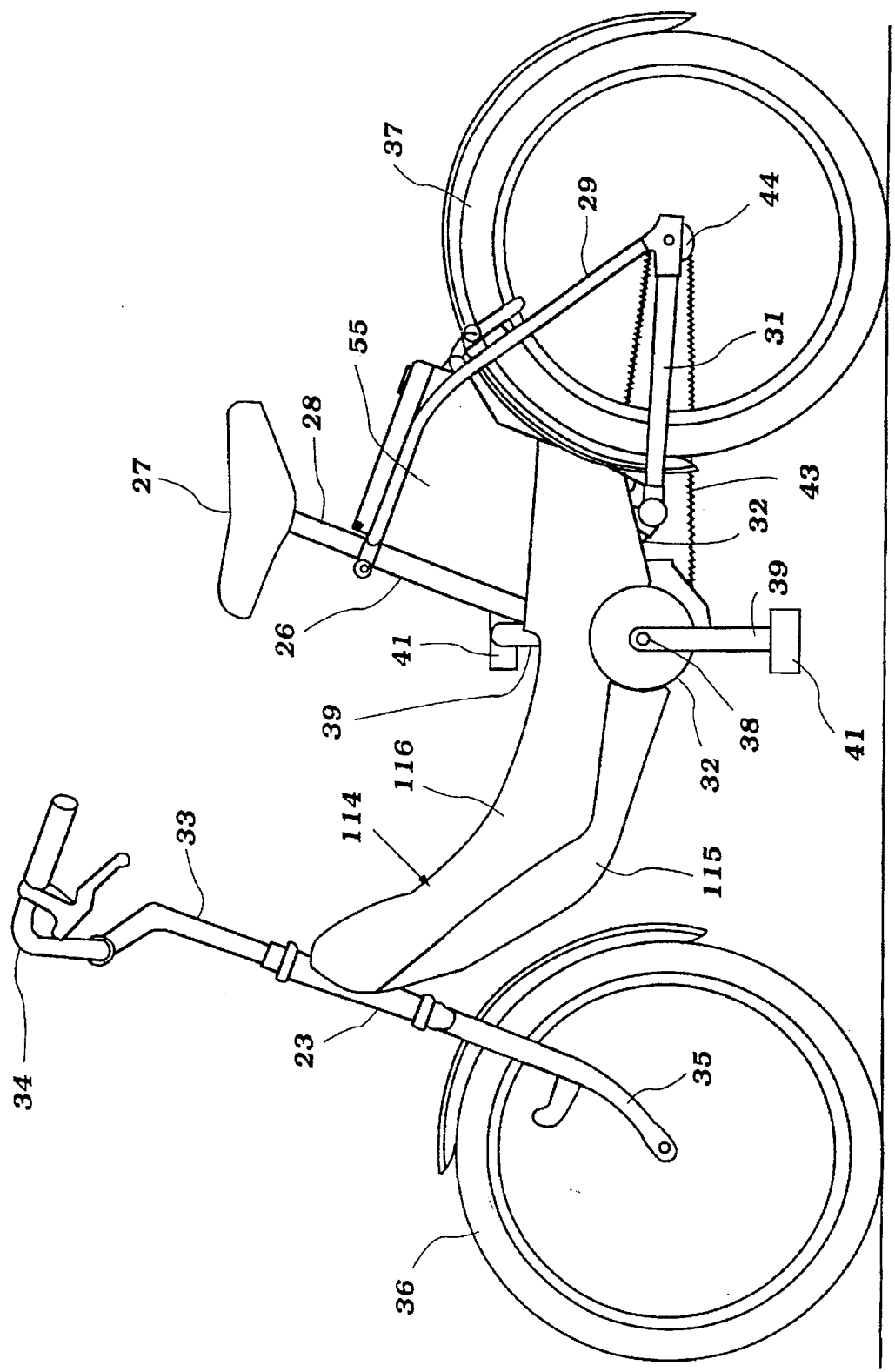
FIG. 2 is a side elevational view, in part similar to FIG. 1, and shows the body assembly in position, and no portions broken away.

Referring now to FIG. 2, the electric motor 45, controller 47 and its case 48 and the main frame tube 24 as well as other components are concealed and protected within a body assembly, indicated generally by the reference numeral 114. This body assembly includes a lower body piece 115 and an upper body piece 116 that are connected to each other in a suitable manner and which conceal these components as may be readily seen by comparing FIGS. 1 and 2. The upper cover 116 is formed with an opening to clear the outer battery case 55 so as to provide a neat appearance and good protection for the bicycle components.

Figure 5:
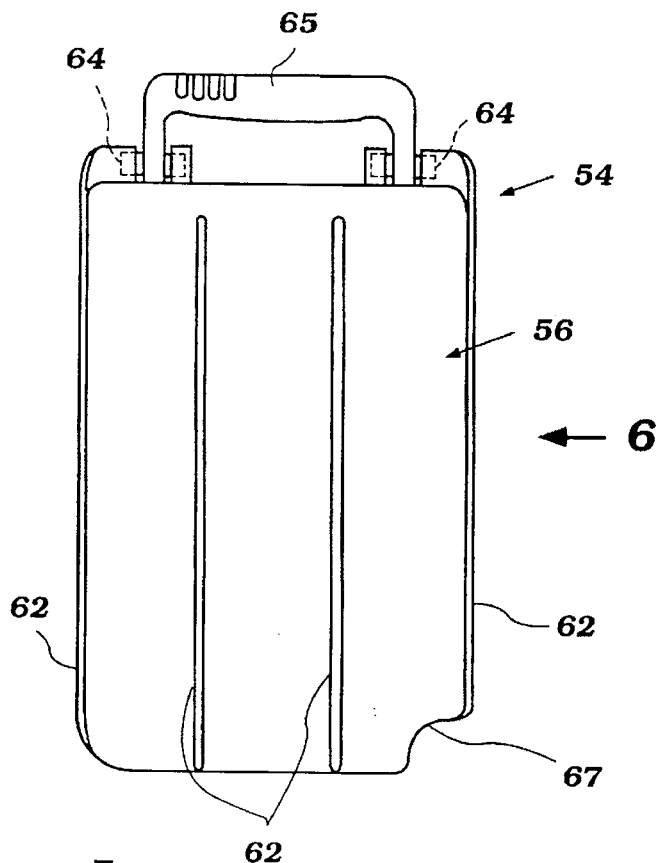
FIG. 5 is a side elevational view, in part similar to FIG. 3 but on a smaller scale, and shows the exterior of the internal battery box.
Figure 6:
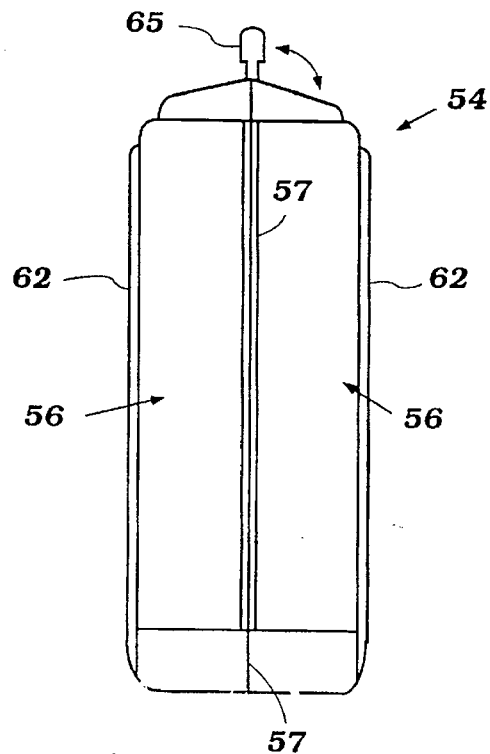
FIG. 6 is an end elevational view looking in the direction of the arrow 6 in FIG. 5.

FIG. 5 shows another embodiment of the invention which basically is the same as the embodiment of FIGS. 1–10 and, for that reason, where components of this embodiments are same they have been identified by the same reference numerals. This embodiment differs from the previously described embodiment in the configuration of the battery case, indicated generally by the reference numeral 201.

The internal structure of the battery case is the same and it is adapted to receive a pair of batteries 53 within a removable inner case 202 that is protected within an outer case 203 having a pivoted cover 204. In this embodiment, the inner case 202 and outer case 203 are curved so that the cover 204 will extend rearwardly of the seat 27 over the rear wheel 37 and, thus, can be opened and closed without necessitating pivoting of the seat 27.

Figure 12:
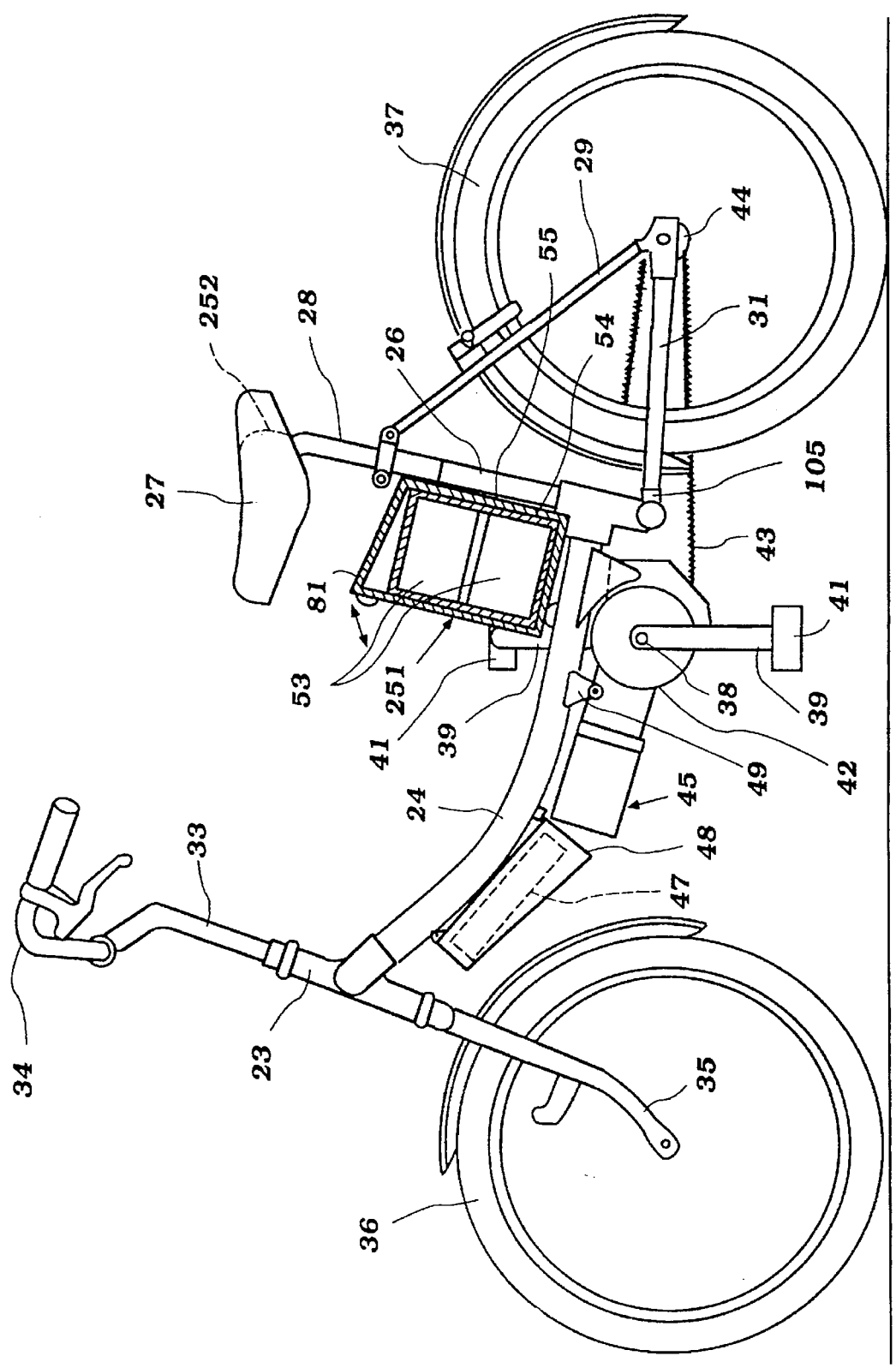
FIG. 12 is a side elevational view with a portion broken away, in part similar to FIGS. 1 and 11, and shows a still further embodiment of the invention.

FIG. 12 shows another embodiment which differs form the previously described embodiments only in the location and configuration of the battery case, indicated generally by the reference numeral 251 in this embodiment. In this instance, the battery case 251 is disposed to the front of the seat pillar 26 rather than to the rear of it. The battery case 251 may have a configuration as previously described in conjunction with the embodiment of FIGS. 1–10 and, for that reason, this construction will not be described again. In this embodiment, however, the seat 27 has its rear portion cut off as indicated at 252 so that, by rotating it in the direction of arrows 253, the upper cover 81 of the battery case 251 may be easily accessed regardless of the vertical height of the seat 27.

Thus, from the foregoing description, it should be readily apparent that the described embodiments of the invention provide a very effective battery arrangement for a vehicle such as a bicycle or other battery powered vehicle. The construction is such that the batteries may be easily detached for charging or for safety or anti-theft purposes and yet their terminals will be well protected against corrosion. In addition, the batteries may be removed and installed without necessitating tools and without necessitating any mechanical detachment of the terminal connections with are just a quick male-female disconnect arrangement.

Of course, the foregoing description is that of preferred embodiments of the invention and various changes and modifications may be made without departing from the spirit and scope of the invention, as defined by the appended claims.

What is claimed is:

1. A rechargeable battery assembly for an electric motor equipped vehicle having a body, an outer battery box carried by said body and containing a terminal internally therein and which terminal is connected externally to the electric motor for powering the electrical motor, said outer battery box defining a sealed internal volume containing said terminal, and an inner battery box adapted to contain at least one rechargeable battery and detachably positioned within said outer battery box, said inner battery box having an external terminal portion cooperable with said outer battery box terminal when positioned within said outer battery box for providing electrical power to said terminal for said vehicle electric motor.

2. A rechargeable battery assembly for an electric motor equipped vehicle as set forth in claim 1, wherein the outer battery box has a removable closure.

3. A rechargeable battery assembly for an electric motor equipped vehicle as set forth in claim 1, wherein at least one of the battery boxes is provided with spaced apart ribs for protection of the batteries carried within the battery boxes.

4. A rechargeable battery assembly for an electric motor equipped vehicle as set forth in claim 3, wherein the inner battery box is provided with the ribs.

5. A rechargeable battery assembly for an electric motor equipped vehicle as set forth in claim 4, wherein the ribs are disposed around the battery on all sides thereof.

6. A rechargeable battery assembly for an electric motor equipped vehicle as set forth in claim 5, wherein the inner battery box is comprised of a pair of similarly shaped housing members detachably connected to each other and defining at least one cavity configured to receive the rechargeable battery.

7. A rechargeable battery assembly for an electric motor equipped vehicle as set forth in claim 6, wherein the outer battery box has a removable closure.

8. A rechargeable battery assembly for an electric motor equipped vehicle as set forth in claim 1, further including a charging terminal contained within the outer battery box and electrically connected to the terminal for charging of the battery when the inner battery box is received within the outer battery box.

9. A rechargeable battery assembly for an electric motor equipped vehicle as set forth in claim 8, wherein the charging terminal is disposed at a position spaced from the terminal.

10. A rechargeable battery assembly for an electric motor equipped vehicle as set forth in claim 9, further including a diode between the charging terminal and the terminal for permitting charging of the battery when in place and precluding the drawing of current from the battery through the charging terminal.

11. A rechargeable battery assembly for an electric motor equipped vehicle as set forth in claim 1, wherein the terminal and the cooperating terminal comprise male and female elements.

12. A rechargeable battery assembly for an electric motor equipped vehicle as set forth in claim 11, wherein there are a pair of such terminals.

13. A rechargeable battery assembly for an electric motor equipped vehicle as set forth in claim 12, wherein the inner case and outer case are configured so that the inner case can be received only in one direction in the outer case wherein the terminals and cooperating terminals can engage.

14. A rechargeable battery assembly for an electric motor equipped vehicle as set forth in claim 13, wherein the inner case and outer case are formed with a curved recess at one lower edge thereof, which recess performs the dissimilar configurations and also provides a mounting flange on the outer case whereby the cases may be mounted on the vehicle.

15. A rechargeable battery assembly for an electric motor equipped vehicle as set forth in claim 12, further including a pivoted carrying handle on the inner case and pivotally between a retracted position for use when received in the outer case and an extending position for carrying of the inner case.

16. A rechargeable battery assembly for an electric motor equipped vehicle as set forth in claim 15, wherein the pivoted handle is formed with an indicator at one side thereof to indicate the correct orientation of the inner case relative to the outer case.

17. A rechargeable battery assembly for an electric motor equipped vehicle as set forth in claim 1, wherein the vehicle comprises a bicycle having a seat post and wherein the outer battery case is mounted along the seat post.

* * * * *